INVENTOR
HENRI KUMMERMAN
ATTORNEYS.

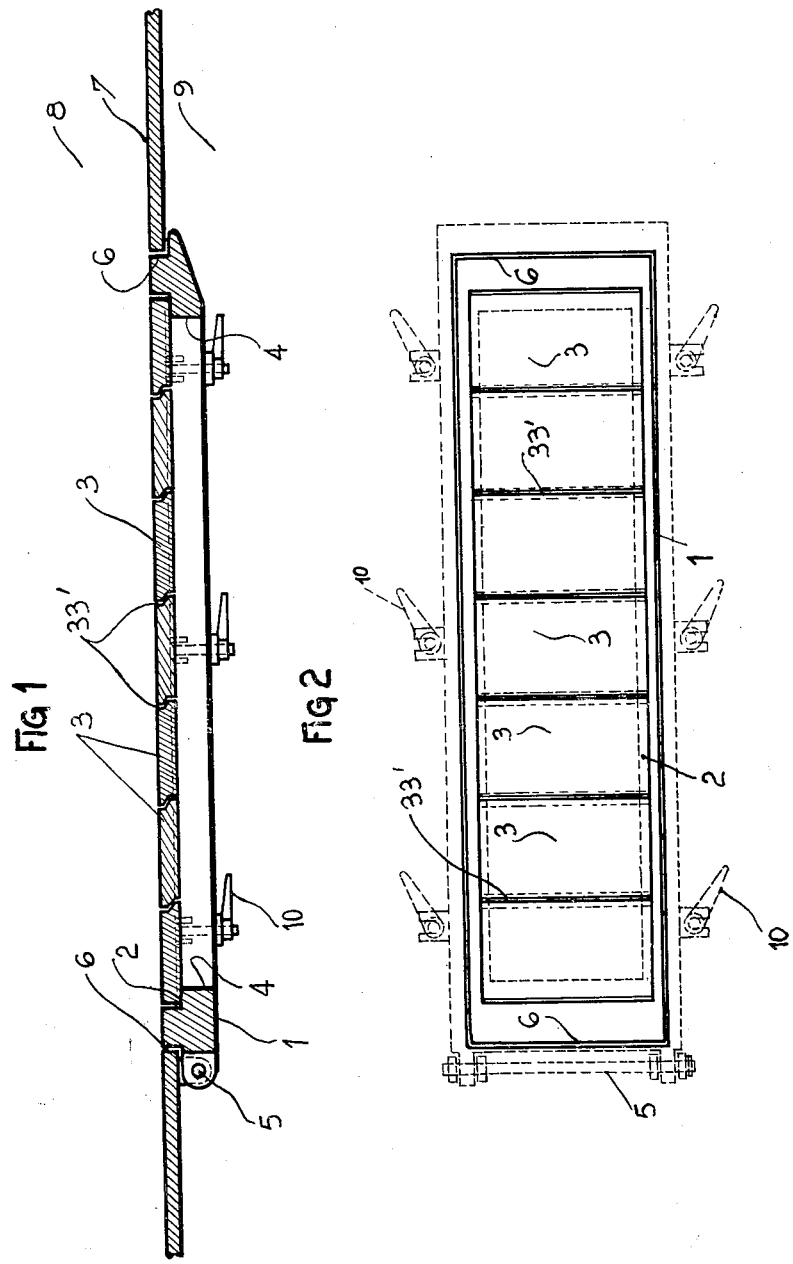

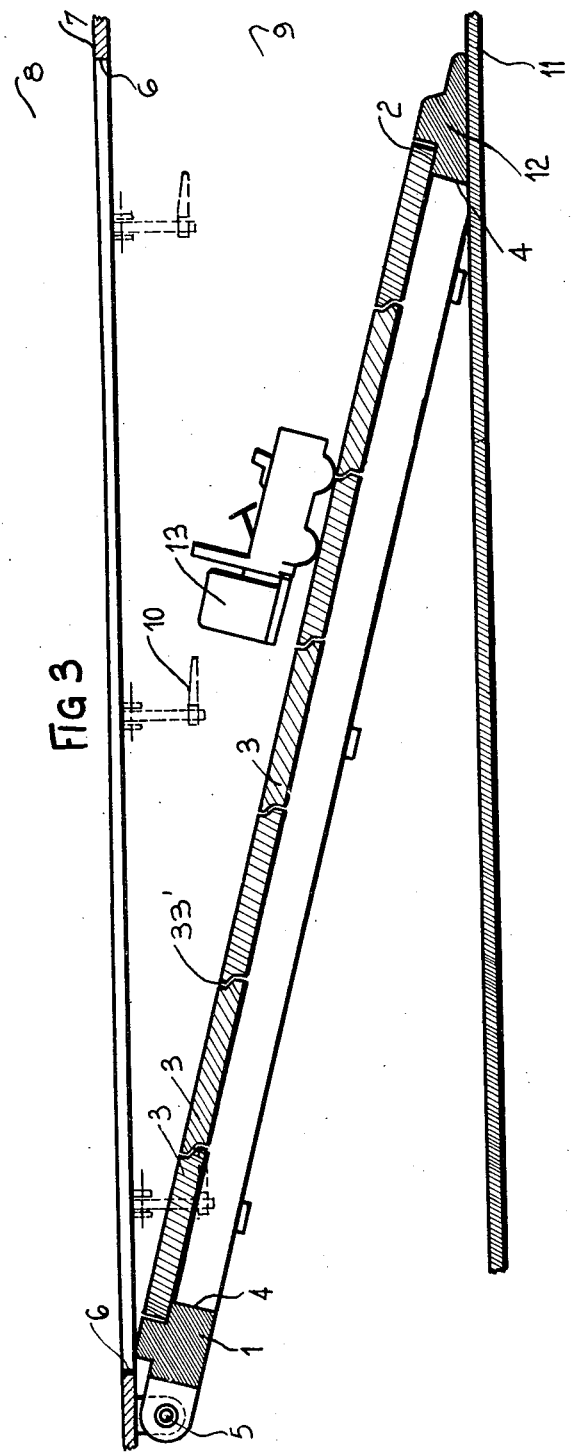

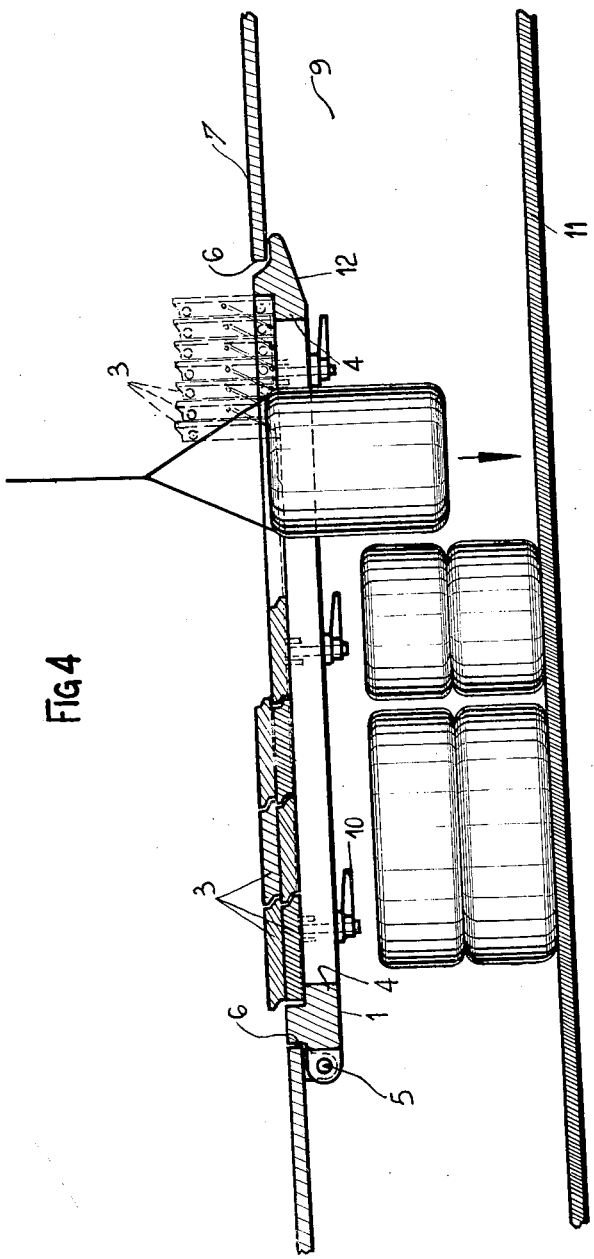

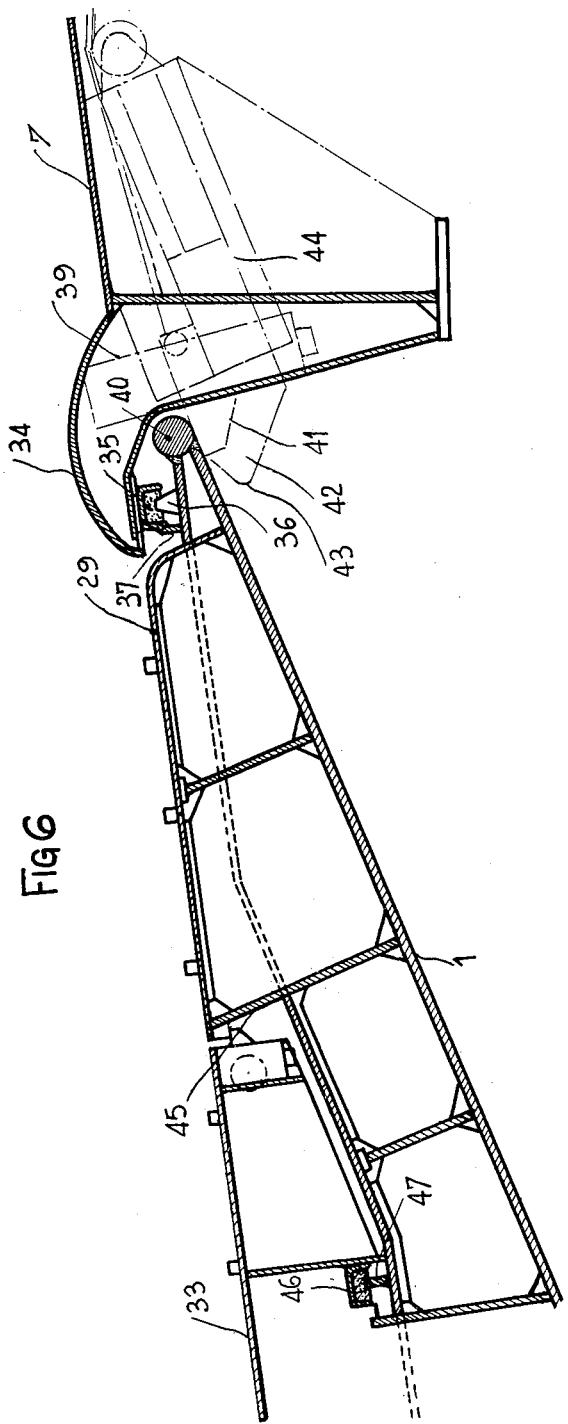

United States Patent Office 2,979,007
Patented Apr. 11, 1961

2,979,007

RETRACTABLE RAMPS FOR INTERCONNECTING SPACES SITUATED AT DIFFERENT LEVELS

Henri Kummerman, Paris, France, assignor to Ateliers et Chantiers de Bretagne (Anciens Ets. de la Brosse et Fouche), Nantes, and MacGregor-Comarain, Paris, France, both companies of France Filed Aug. 26, 1958, Ser. No. 757,234

Claims priority, application France Sept. 20, 1957

8 Claims. (Cl. 114—72)

This invention relates essentially to a device constituting a retractable ramp for interconnecting two spaces situated at different levels. This device is applicable to both fixed installations, notably in garages, silos, port warehouses and the like, and movable installations, notably on ships, lorries, wagons, and the like.

In this respect it may be noted that ships in which the cargo is handled horizontally (such as "Trailer-ships") comprise, in addition to the doors and ramps carried laterally, internal ramps whereby the goods may be transferred to the different 'tween-decks either by themselves if they are self-propelled or by using any suitable separate source of power, such as tractors, fork-lift trucks, etc.

It is a widely acknowledged fact that horizontal handling, by avoiding any load discontinuity or upsetting, is more advantageous than vertical handling as employed on conventional-type cargo ships with the assistance of port cranes or mast-derricks. However, the vertical handling of goods may still be useful or necessary, according to the nature of the cargo and the conditions in which the loading or unloading operations are effected (ill-disposed quays, unloading on lighters, hoppers or barges, etc.) and an advantageous solution would consist in having ships arranged for carrying out both horizontal and vertical handling methods.

However, on ships of this type the inner ramps, which are usually fixed, would constitute an obstacle as far as this ideal solution is concerned, for it would be necessary to retract them from the vertical projection of the hatchways formed through the different decks in case of vertical handling. On the other hand, it would be advantageous, also in case of vertical handling, to recover the useful space lost on account of the presence of the ramps 'tween-decks at the expense of the cargo-transporting capacity.

Now it is the object of this invention to provide a device adapted on the one hand to be rapidly converted for handling goods either vertically or horizontally on a ship, in a fixed or movable installation, etc. and on the other hand, to recover, in case of vertical handling, the space lost as a consequence of the presence of the ramp between the decks or levels of the ship, shed or the like in which the goods were previously handled horizontally.

The device according to this invention is of the type comprising an element constituting a platform hingedly attached at one end about a substantially horizontal axis and adapted to occupy two end positions, said platform, in one of its end position, being substantially co-planar with the ship's deck or the like, or with the upper floor of a fixed or movable installation, and closing the underlying space, whereas in its other end position the same platform is inclined and constitutes a ramp permitting the access to said deck or floor. This device is remarkable notably in that the aforesaid platform-forming element consists of a frame supporting movable panels of the type utilised for closing ship's hatchways or movable roofs and adapted to open or close the inner surface of said frame.

Other features and advantages of this invention will appear as the following description proceeds with reference to the attached drawings forming part of this specification and illustrating diagrammatically by way of example a few forms of embodiment of the invention. In the drawings:

Figure 1 is a complete view of a device constructed according to the teachings of this invention and shown in longitudinal section;

Figure 2 is a plan view corresponding to Figure 1;

Figure 3 is a complete view of the device released for horizontal handling, shown in longitudinal section;

Figure 4 is a complete view of the same device adapted for vertical handling, shown in longitudinal section;

Figure 6 is a longitudinal section similar to Figure 5 but showing the opposite end of the frame concerned.

Figure 5:
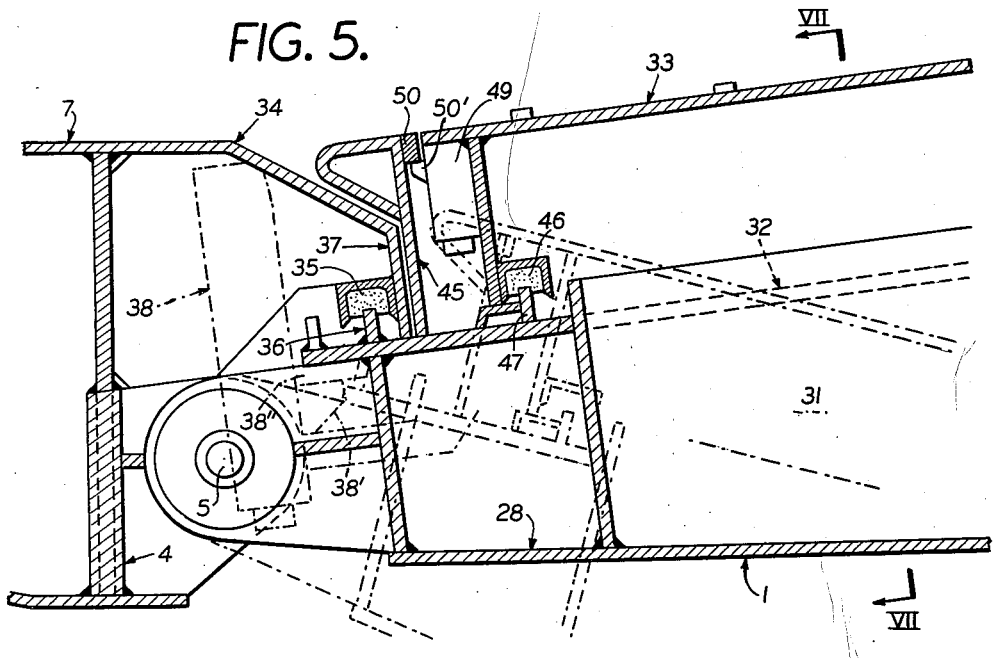
Figure 5 is a longitudinal fragmentary section showing on a larger scale the manner in which the ramp-forming frame is hingedly connected to the deck of a ship, the frame being shown in thick lines in its closed position and in dash-and-dot lines in its inclined, ramp-forming position.

In the form of embodiment illustrated by way of example in the attached drawings the device of this invention comprises essentially a frame 1 carrying on its step- or shoulder-forming inner edge 2 a plurality of retractable hatch cover sections 3 covering completely the inner space 4 of this frame 1. The frame is hingedly attached by a pin 5 to the edge of the hatchway 6 (in the case of a ship) formed in the deck, for example between the decks 8 and 9. This frame 1 comprises a plurality of clamping devices 10 of any suitable or known type, adapted to secure the frame to the weather deck or floor 7.

This frame 1 may be set in two end positions: in the first end position, as shown in Figure 1, the frame is pressed against and co-planar with the weather deck 7 by clamping devices 10; in the other end position, as shown in Figure 3, the frame is released from the weather deck 7 and extends obliquely with its end 12 opposite to the hinge pin 5 resting on the underlying deck 11 (Figure 3), this opposite end being specially shaped to this end.

When used for horizontal handling, the frame 1 of the device of this invention, which device may be termed "ramp-forming panel," occupies the second position as shown in Figure 3, with the sections 3 positioned in the frame 1 to permit the transport of goods 13 from one to the other 'tween-decks 8, 9. The dimensions and strength of sections 3 are sufficient to permit the transport of loads, their type being immaterial.

When used for vertical handling, the frame 1 of the ramp-forming panel occupies the first position as shown in Figure 4, but the sections 3 have been removed, thus freeing the inner space 4 of frame 1 and permitting the handling of goods without inconvenience, for example when loading or unloading the 'tween-deck 9 in the region underlying the inner space 4, thus recovering the volume which would otherwise have been lost in this lower 'tween-deck or level if a conventional-type horizontal-handling ramp of the ship or warehouse had been used. When the loading of the lower 'tween-deck 9 has been completed, the sections 3 are put back in their place in the frame 1, and the ramp-forming panel retained by the clamping devices 10 may then be loaded in turn with goods exactly as the weather deck 7, thus affording a complete filling of the overlying 'tween-deck 8. The dimensions and strength of the clamping devices 10 and sections 3 are sufficient to withstand the loads accumulated in the space 8.

The application of the general principle of the device of this invention to the special case of a modern ship in which it is essential that the loading and unloading operations be carried out very rapidly will now be described.

Figure 7:
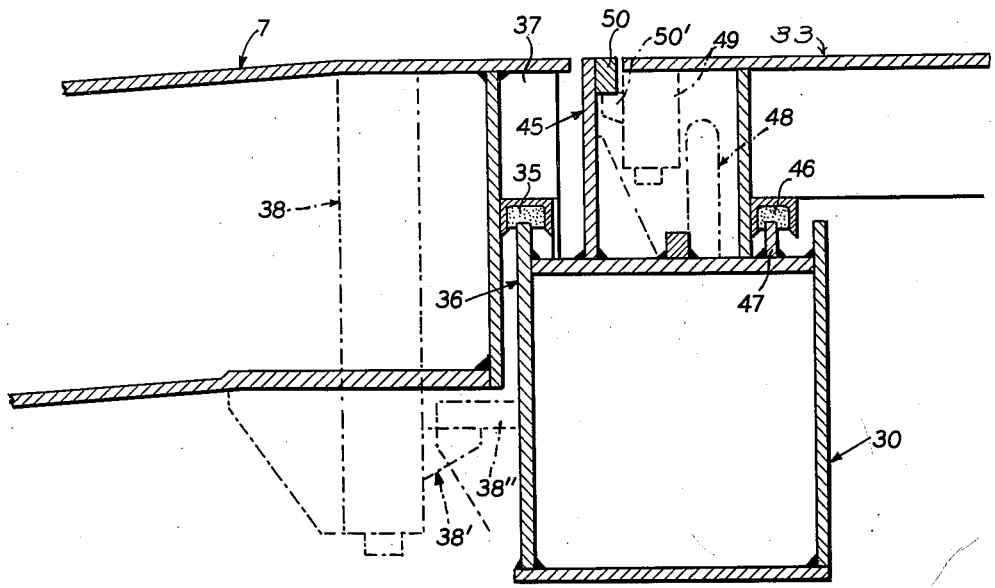
Figure 7 is a cross section taken on a larger scale upon the line VII—VII of Figure 5.

In the example shown in Figures 5, 6 and 7, it is assumed that the frame 1 consisted of girders or preferably tubular elements. As shown in these figures, two transverse girders 28, 29 and two longitudinal girders 30, 31 are used. At their upper portion these longitudinal girders 30, 31 are provided with runways or guideways 32 adapted to enable the hatchway closing sections 33 to roll for closing or opening the frame aperture 4. Sealing gaskets 33' (Fig. 1) are located between the adjacent edges of two adjacent panels or sections.

Of course, the sections utilized to this end may be of any known or suitable type. Thus, for example, hingedly interconnected folding sections may be used, such as the MacGregor, Mège and other section types. In the example shown and described herein, the sections are of the MacGregor type, that is, sections consisting of relatively independent sections, adapted to roll and to be actuated separately or simultaneously by mechanical, electrical or hydraulic means, or "pontoon" type sections.

One of the lateral or end edges of the frame 1 is hingedly attached to the weather deck 7 by means of the hinge pin 5 mentioned hereinabove. A weather-board like element 34 is provided on the edge of the aperture 4 provided in the deck so as to cover automatically the entire periphery of the frame 1 when the latter closes the aperture. Under this weather-board a sealing gasket 35 for example of resiliently deformable material is provided and adapted to co-act with a projection 36 carried by the upper portion of the girders constituting the frame 1. In order to reduce the compression of the material constituting the sealing packing, an additional contact is provided between the weather-board and the frame, in the form of a rigid element 37 carried by this frame.

When it is desired to close the aperture 4 and to compress the sealing packing or gasket 35, the frame 1 is held in position by using cover-clamps 38 or like devices well known in the technique and as will readily occur to specialists. These clamps may consist, for example, of lugs 38' co-acting with heels or straps 38" carried by the frame 1. The free end of the frame 1 (which corresponds to the girder 29) is held in position by clamps 39 which may be of same character as the devices 38, if desired.

Automatic locking means may also be associated with the frame, if desired. In Figure 6, this solution is illustrated in dash-and-dot lines. In this example, the frame is provided with a rounded end element 40 co-acting not only with the lug 41 of the clamping device 39 but also with a nose 42 formed with a cam-face 43 which is urged by a member 44 either of resilient character or in the form of a piston actuated by a fluid under pressure. The heel or nose 42 retracts when the frame moves upwards and subsequently engages the under face of the rounded end element 40.

In the example illustrated, the sections 33 are of the flush-deck, water-tight type, that is, adapted when closed to form with the frame and weather deck a surface substantially smooth and without appreciable unevennesses. The sections of this character are well known in the field. In the case contemplated herein they are utilized as follows: on the frame-forming girders a slightly recessed edge portion 45 is formed for example by a projecting element. Preferably, the height of this element will be so selected that when the sections engage their corresponding sealing gasket they will not project outside this element. The sections comprise at their lower portion sealing gaskets 46 of which the lining consists of an elastically deformable material contacting the projecting elements 47 of the frame-forming girders. The sections themselves are displaceable on rollers 48 for example of the type having eccentric axles (see Figure 7). The fastening or clamping devices 49 of the flush-deck type are provided on the sides of the sections and provided with heels or straps 50' co-acting with lugs 50 carried by the edges of the projecting elements 45 of the girder.

The mounting shown in the drawings is remarkably simple. More particularly, it will be seen that all the sealing gaskets are of a type well tested in the practice, that they are protected against heavy sea and any possible deterioration due to their position at the lower portion not only of the sections but also of the weather-board 34; moreover, the ramp-forming frame 1 comprises only small projections engaging these sealing gaskets. On the other hand, these projections may be parallel and vertical, so that the practical actuation of the frame is rendered particularly easy and simple.

In Figure 6 there is shown the free end of the frame as being thinned out, but it will be readily understood that this portion may have any other shape as consistent with local requirements or other conditions.

Of course, the invention is also concerned, by way of novel industrial products, with the shipholds, decks and 'tween-decks of ships provided with the improved device described hereinabove.

Of course, the present invention should not be construed as being limited to the few forms of embodiment shown and described herein as these are given by way of example only and as many modifications may be brought thereto without departing from the spirit and scope of the invention as set forth in the appended claims.

What I claim is:

1. In a ship having a weather deck, a lower deck and a hatch opening in the weather deck: retractable closing means for said hatch opening comprising a ramp including an open frame member conformably fitting said opening and retractable hatch cover sections supported by said frame to close and open the opening in the latter, said sections being retractable to provide access to the lower deck through the opening in said frame; and means for securing said ramp in weather-tight engagement with said weather deck; said open frame member being hingedly secured to said weather deck at one edge of said hatch opening to swing between a substantially horizontal hatch closing position and an inclined position in which said ramp forms a sloping gangway between said two decks.

2. Retractable closing means as claimed in claim 1, wherein said frame consists of girders and comprises runways for said sections provided on the edges of said hatch opening.

3. Retractable closing means as claimed in claim 1, in which said open frame member has edges extending into said hatch opening, said edges having a step-like shape, the step portion of which has a height substantially equal to the thickness of the corresponding sections.

4. Retractable closing means as claimed in claim 1, wherein a weather-board forming element is provided on said weather deck and overlies the outer periphery of said frame.

5. Retractable closing means as claimed in claim 4, wherein a sealing gasket member of resilient deformable material is provided on the lower part of said weather-board forming element, and said element has a projecting portion extending toward said frame and cooperating with said frame for limiting the degree of compression of said resilient material.

6. Retractable closing means as claimed in claim 2, wherein sealing resilient gasket members are provided on the lower faces of said sections, and a projection is provided on said girders cooperating with said gasket member.

7. Retractable closing means as claimed in claim 4, wherein the connection between said frame and said hatch opening is provided beneath the said weather-board forming element.

8. Retractable closing means as claimed in claim 1, wherein a weather-board portion is provided on the plane of said hatch opening and overlies the outer periphery of said frame, a sealing gasket member of resiliently deformable material is provided on the lower part of said weather-board portion, and a projecting portion is provided on said frame cooperating with said gasket member; said frame and said weather deck around the hatch opening being provided with rigid abutment means directly engageable with, respectively, said weather deck and said frame, to limit the degree of compression of said resiliently deformable material upon movement of said ramp to the hatch closing position.

References Cited in the file of this patent

UNITED STATES PATENTS

| | | |
|---|---|---|
| 1,815,687 | Watts | July 21, 1931 |
| 1,905,947 | Morgan | Apr. 25, 1933 |
| 2,091,775 | Yorke | Aug. 31, 1937 |
| 2,729,185 | Kummerman | Jan. 3, 1956 |
| 2,754,014 | Santochi | July 10, 1956 |
| 2,774,420 | Lacomte | Dec. 18, 1956 |

OTHER REFERENCES

Watertight Steel Hatch Covers by MacGregor-Comarain Inc., Dec. 11, 1952, page 7.